July 12, 1927.

L. M. DIETERICH

NUT LOCKING DEVICE

Filed March 2, 1921

1,635,313

Inventor
LUDWIG M. DIETERICH

By his Attorney

Patented July 12, 1927.

1,635,313

UNITED STATES PATENT OFFICE.

LUDWIG M. DIETERICH, OF NEW BRUNSWICK, NEW JERSEY, ASSIGNOR OF ONE-FOURTH TO FREDERICK S. DICKINSON AND ONE-FOURTH TO LINDLEY VINTON, BOTH OF NEW YORK, N. Y.

NUT-LOCKING DEVICE.

Application filed March 2, 1921. Serial No. 448,960.

This invention relates to nut locking devices. One of the objects of the invention is to provide improved means for the prevention of accidental or undesirable relative movement between a nut and a bolt or screw, after they have been positioned or set home with a desired pressure.

Another object of my invention is to provide a device of the above character, of simple and inexpensive construction, which will be of the highest efficiency in operation.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawing, wherein is shown several preferred forms of embodiments of my invention:

Similar reference characters refer to similar parts throughout the several views of the drawing.

Before proceeding with a description of the construction of the various embodiments of my invention, it may be of advantage to state at this point, that this invention is based upon properties of cork, cork wood, or cork compounds, which properties are produced in such material by the application of mechanical pressure.

The aforesaid properties are clearly brought out in my pending application, Serial Number 259,632. They may be briefly restated, however, as being a developed elasticity of the material in question, with an elastic limit, far beyond the elastic limit of the natural cork, or cork particles contained in cork compounds. This developed elasticity which is produced in cork by mechanical pressure, also produces in such cork a quality whereby it will rebound or re-expand after such pressure has been initially applied to it, to a predetermined degree, and will maintain such expansion or rebounding qualities indefinitely, regardless of the applied pressure or elapsed time of static application of such pressure.

In other words, as pointed out in my aforesaid pending application, such application of pressure may be given cork, or cork compound, to reduce it volumetrically and give it a practical working set, which not only prevents its expansion beyond the limits of the set, but also converts the reduced and set body into a body which is very freely and highly elastic within the limits of its set. This pressure I have discovered is such a pressure as will compress the natural cork wood beyond the limits of its natural elasticity.

In the embodiments of my invention, which I shall now proceed to describe, I utilize the aforesaid properties of cork in such a way as to provide a nut lock washer, lock nut, or a lock bolt or stud, wherein a constant stress or pressure is exerted upon the head of the nut, or the head of the bolt, whereby any amount of jarring or vibration will not destroy the frictional thread engagement necessary to prevent a relative rotative movement between the parts of the nut or bolt united or held together by the threaded engagement. Elongation of the bolt is prevented by the fact, that less resistance is offered by the cork washer than by the bolt.

Figure 1:
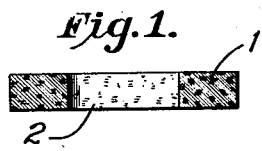
Figure 1 is a view in vertical section of the simplest form of embodiment of my invention.
Figure 2:
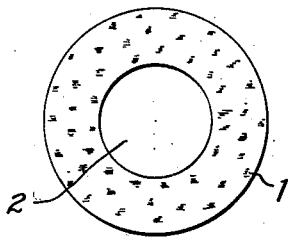
Figure 2 is a plan view of the structure illustrated in Figure 1.

Referring now to Figures 1 and 2 of the drawings, the reference numeral 1 denotes a cylindrically formed body of cork, which may be composed of natural cork wood, or cork composition. This cylindrically formed body of cork is provided with a circular aperture 2, through which the shaft of the bolt extends, it being understood that if this body of cork is used as a locking device in connection with a nut, it will be interposed between the working face of the nut and the parts clamped between the head of the bolt and the nut, and that if said body is used to hold the head of a bolt against rotation, such as for instance a tap screw or bolt, it will be interposed between the working face of the head of the bolt and the outer surface of the exterior part, through which said bolt extends. This body of cork may or may not have been provided with what I have hereinbefore described as a permanent set, since the applied pressure of setting home the nut may produce the developed elasticity of the cork which I have found, will cause such a spring pressure between the screw engaging parts as will effectively resist any relative rotative retrograde movement between the parts at their point of threaded engagement.

It will also be understood that a pressure may be exerted upon the body of cork 1 as will compress it beyond the limits of its natural elasticity, and thereby give it a permanent set, whereby it will freely be elastic within the limits of said set.

Figure 3:
Figure 3 is a vertical sectional view, showing another embodiment of my invention.
Figure 4:
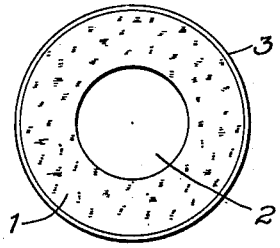
Figure 4 is a plan view of the embodiment of my invention illustrated in Figure 3.

In the embodiment of my invention shown in Figures 3 and 4, I have shown the body of cork 1 enclosed or confined within a cylindrically formed casing 3, whereby said body is prevented under stress or pressure from expanding in a lateral direction.

Figure 5:
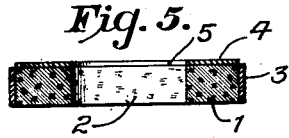
Figure 5 illustrates another embodiment of my invention.
Figure 6:
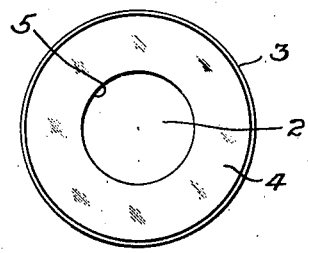
Figure 6 is a plan view of the embodiment of my invention illustrated in Figure 5.

In the embodiment of my invention shown in Figures 5 and 6, I employ the circumferential enclosing member 3, and provide in addition thereto a cylindrically formed flat washer or apertured disk 4, which overlies the outer face of the body 1, said washer having an aperture 5, which registers with that of the body 1.

Figure 7:
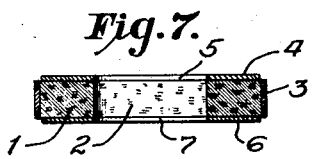
Figure 7 is a vertical sectional view of another embodiment of my invention.
Figure 8:
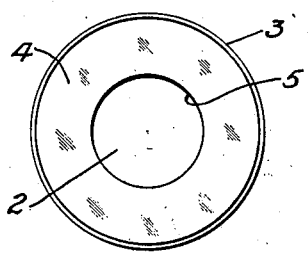
Figure 8 is a plan view of the embodiment of my invention illustrated in Figure 7.

In the embodiment of my invention shown in Figures 7 and 8, I have provided in addition to the cylindrically formed confining member 3, and the apertured washer 4, a second apertured washer 6, which underlies the lower surface of body 1. This washer, as in the case of aperture 5, is apertured as at 7, the apertures 5, 2 and 7 lie in registry, so that the shaft of the bolt can be passed through the structure.

Figure 9:
Figure 9 is a vertical sectional view of another embodiment of my invention.
Figure 10:
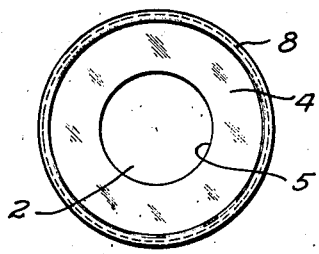
Figure 10 is a plan view of the embodiment of my invention illustrated in Figure 9.

In the embodiment of my invention shown in Figures 9 and 10, the cylindrically formed enclosing member 3 is shown as being flanged or spun, as at 8 and 9, about the edges of the metallic washers 4 and 6, thereby forming an integral structure.

Figure 11:
Figure 11 is a vertical sectional view showing another embodiment of my invention.
Figure 12:
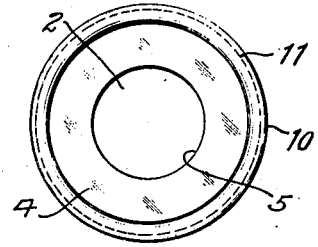
Figure 12 is a plan view of the embodiment of my invention illustrated in Figure 11.

In the embodiment of my invention shown in Figures 11 and 12, the body of cork 1 is inserted in a cylindrically formed cup-shaped member 10, the upper edge of said cup-shaped member being flanged or spun over the washer 4, as at 11, the cup-shaped member being provided with an aperture 12, which registers with the aperture 5 of said washer 4.

Figure 13:
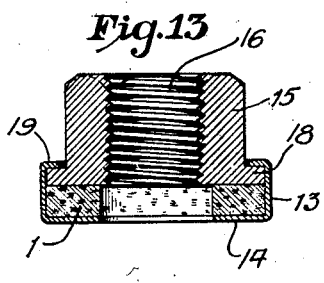
Figure 13 is a view in a vertical section of still another embodiment of my invention.
Figure 14:
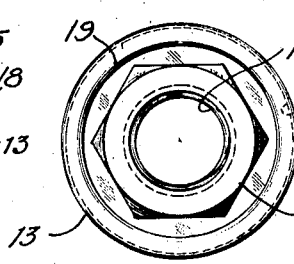
Figure 14 is a plan view of the embodiment of my invention illustrated in Figure 13.
Figure 15:
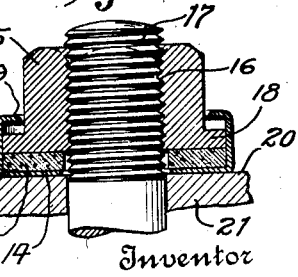
Figure 15 is a vertical sectional view, showing the embodiment of my invention illustrated in Figures 13 and 14, mounted upon a bolt or screw with the parts in operative positions.

In the embodiment of my invention shown in Figures 13 to 15 inclusive, the body of cork 1 is confined in a cup-shaped member 13, constructed to confine said cork circumferentially, as well as to lie in engagement with the lower surface of the cork, the flange 14 of said cup-shaped member performing this latter function.

The reference numeral 15 indicates a nut, threaded in the usual manner, as at 16, to receive the threaded end of the bolt 17, said nut adjacent its working face being provided with a laterally extending flange 18. The flange portion 18 of this nut is received in the cup-shaped member 13, the latter having a flange 19, which extends over the upper surface of the flange 18 of the nut, whereby the entire structure composed by the nut, the body of cork 1 and the cup-shaped member 13, are formed into practically an integral structure.

The manner of using the device comprising this embodiment of my invention, is illustrated in Figure 15, wherein the device is shown as being set home against a surface 20 of a part 21, comprising one of the parts desired to be fastened together by means of the bolt 17, and its nut 15.

As in the other described embodiments of my invention, this body of cork may, or may not have, an initial permanent set, so that when the device is screwed or set home, as shown in Figure 15, the body 1 will be compressed as shown in said figure, or as already explained, pressure applied to the body of the cork 1 by the screwing or setting home of the nut, may exceed the natural elasticity of the cork comprising the body 1, whereby it will be given its developed elasticity.

In any event, due to the elasticity of the body of cork 1, such an engaging pressure will be established between the lower face 14 of the structure, and the face 20 of the part 21 in engagement therewith, that any accidental or unintentional retrograde movement of the nut upon the bolt will be effectively prevented.

Moreover, due to the elasticity of the body of cork 1, the lower surface 14 of the cup-shaped member 13 will find a perfect seat against the surface 20 of the part 21.

Of course, if an arrangement of parts such as shown in Figures 13 to 15 be employed in connection with the head of a bolt, such as a top bolt, the head of the latter may be flanged, whereby an arrangement of parts, similar to that shown in the last described embodiment of the invention, may be provided.

It will accordingly be seen that I have provided a construction, wherein among others the aims and objects of the invention are attained in a simple and most facile manner. In the use of a nut or bolt lock, such as above described, it has been found that no amount of jarring or vibration will cause loosening of the parts held together by the nut and bolt, due to a retrograde relative movement between the last mentioned elements.

Moreover, the elasticity of the cork allows the contraction and expansion of bolts or other parts of the bolted system during temperature changes, such as ordinarily permanently lengthens the bolts, thereby causing a loosening of the clamped together parts when again contracting.

The device is also simple in construction and inexpensive to manufacture. The body of cork is not injuriously affected, nor its properties destroyed by moisture or the lack of it; nor is it injuriously affected by other changes in climatic conditions, by oil or by common solvents. In the following claims the word "cork" is intended to mean natural cork or cork compounds and the word "screw" is intended to include bolts, studs or other mechanical elements suitably threaded and engaged with a part or element or formed to have nuts fitted thereon.

As many changes could be made in this construction without departing from the scope of the following claims, it is intended that all matter contained in the above description or shown in the accompanying drawing shall be interpreted as illustrative only and not in a limiting sense.

Having thus described my invention what I claim as new and desire to secure by Letters Patent is:

1. A precompressed cork nut lock washer.
2. A precompressed cork nut lock washer circumferentially confined.
3. A precompressed cork nut lock washer circumferentially confined in combination with a metallic washer.
4. A precompressed cork nut lock washer circumferentially confined in combination with a plurality of metallic members held against separation by the circularly confining ring.
5. A precompressed cork nut lock washer circumferentially confined in combination with a plurality of metallic members held against separation by the circumferentially confining ring, one of the metallic members being threaded to fit the threads of a screw.
6. A precompressed cork nut lock washer circumferentially confined in combination with a plurality of metallic members, one thereof being in the form of a cup having a rim reduced in size below the size of that portion of another of said members adapted to be received within said cup.
7. A lock nut, comprising, in combination a nut, a cupped washer slidably arranged with reference to the nut, and a precompressed cork washer interposed between the nut and the washer.
8. A lock nut, comprising in combination, a flanged nut, a cupped washer sliding on the flange of said nut, a rim of the cupped washer being reduced in size below the diameter of the flange, and a precompressed cork washer interposed between the nut and the washer.
9. In combination, a screw, a nut fitted thereon, and a precompressed cork lock washer interposed between the head of the screw and the portions to be clamped between the head and the nut.
10. A cork nut lock washer precompressed and maintained under predetermined compression.
11. A nut lock washer containing as its operative element a body of cork maintained under a compression equal to or greater than that which will reduce permanently the volume which the body of cork had in its natural state.
12. A cork nut lock washer in which the cork is compressed beyond the elastic limit of the cork in its natural state.

In testimony whereof, I affix my signature.

LUDWIG M. DIETERICH.